June 2, 1942.  E. J. RAY  2,284,846
TRIMMING MACHINE
Filed May 14, 1941  2 Sheets-Sheet 1

INVENTOR
Eugene J. Ray
By his Attorney

June 2, 1942.  E. J. RAY  2,284,846
TRIMMING MACHINE
Filed May 14, 1941  2 Sheets-Sheet 2
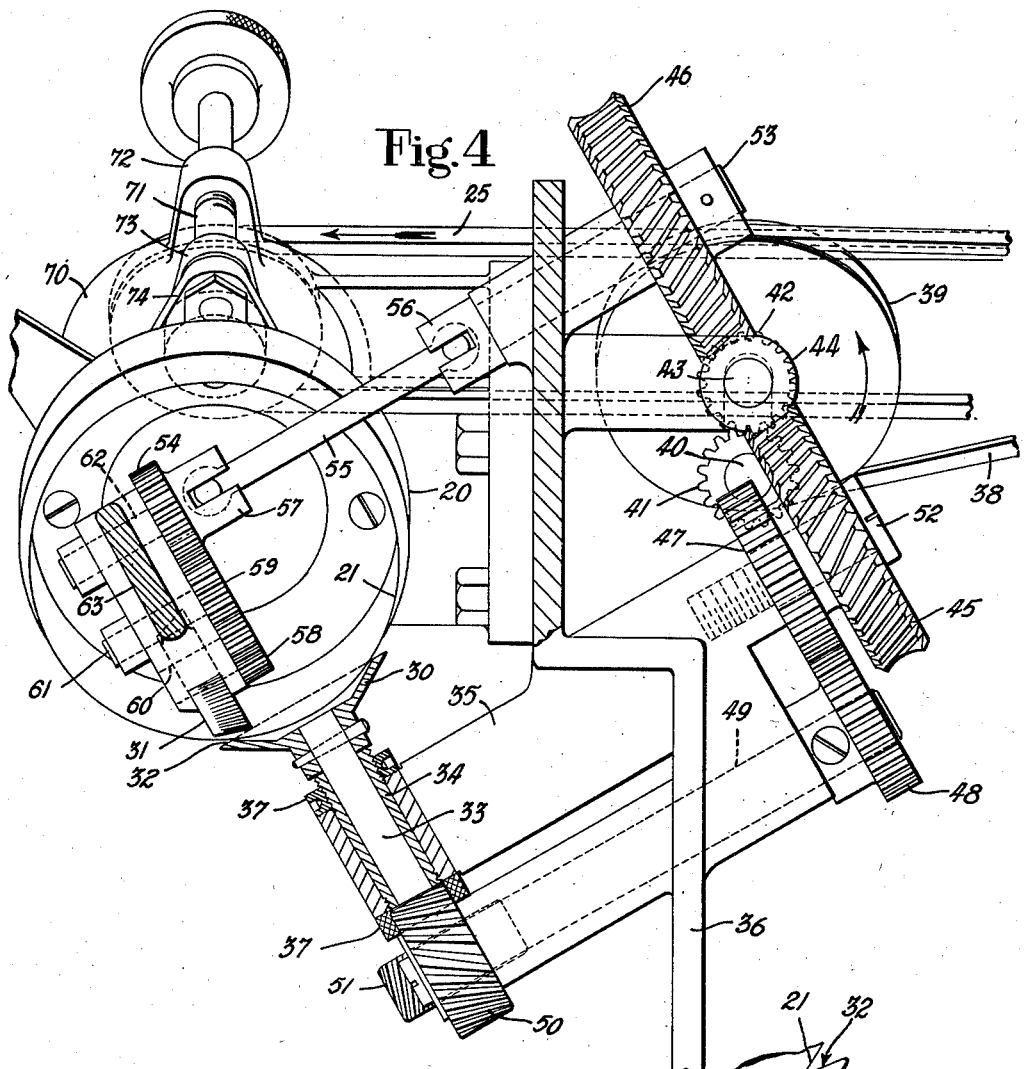
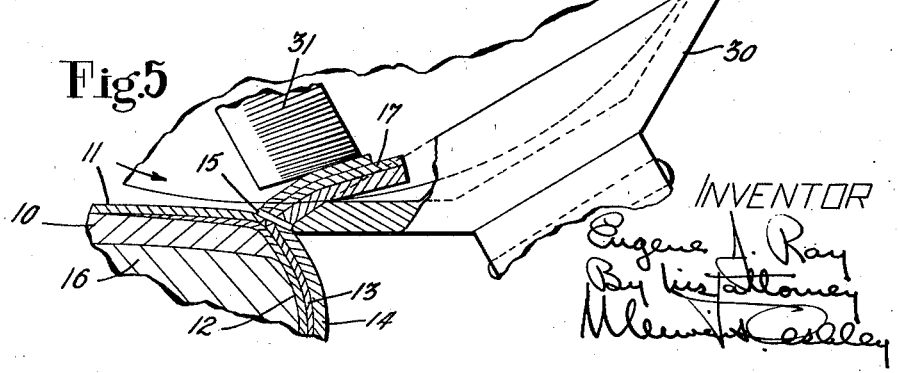
INVENTOR
Eugene J. Ray
By his Attorney Patented June 2, 1942

2,284,846

UNITED STATES PATENT OFFICE 2,284,846

TRIMMING MACHINE

Eugene J. Ray, Beverly, Mass., assignor to United Shoe Machinery Corporation, Flemington, N. J., a corporation of New Jersey Application May 14, 1941, Serial No. 393,306

2 Claims. (Cl. 12—83.5)

This invention relates to trimming machines and is concerned with the problem of trimming the outturned flange of a lasted stitchdown shoe in such a way as to prepare the flange to receive a mock welt and to form an oblique lap-joint therewith.

The machine herein illustrated and described provides an improved organization by which surplus material of such a flange may be severed with a beveling cut along a line parallel with the root of the flange and at a predetermined distance therefrom. The cutting problem for such an operation is due in part to the fact that a beveling cut is required and in part to the instability or pliability of the flange which comprises layers of woven fabric and upper leather. Smooth and even cutting of such materials requires a continuous draw cut with an endless cutting edge, but it also requires firm control of the materials to maintain them in the desired oblique relation to the cutting portion of the cutter. The necessary control is provided by a pair of cooperative feed-rolls that grip the flange at a point ahead of, but close to the cutter and maintain the flange in a relation to the cutting edge that insures a beveling cut. Moreover, the continuous frictional drag of the cutter incidental to the motion that produces a draw cut is utilized to maintain the root of the flange against the rim of one of the feed-rolls that runs in the crease formed by the flange and the body of the upper.

Referring to the drawings:

Fig. 4 is a side elevation, partly in section, of the trimming assemblage; and

Fig. 5 is a large-scale sectional view including a portion of the type of shoe to which the invention relates, the outturned flange of the shoe being represented as in process of being trimmed.

Figure 1:
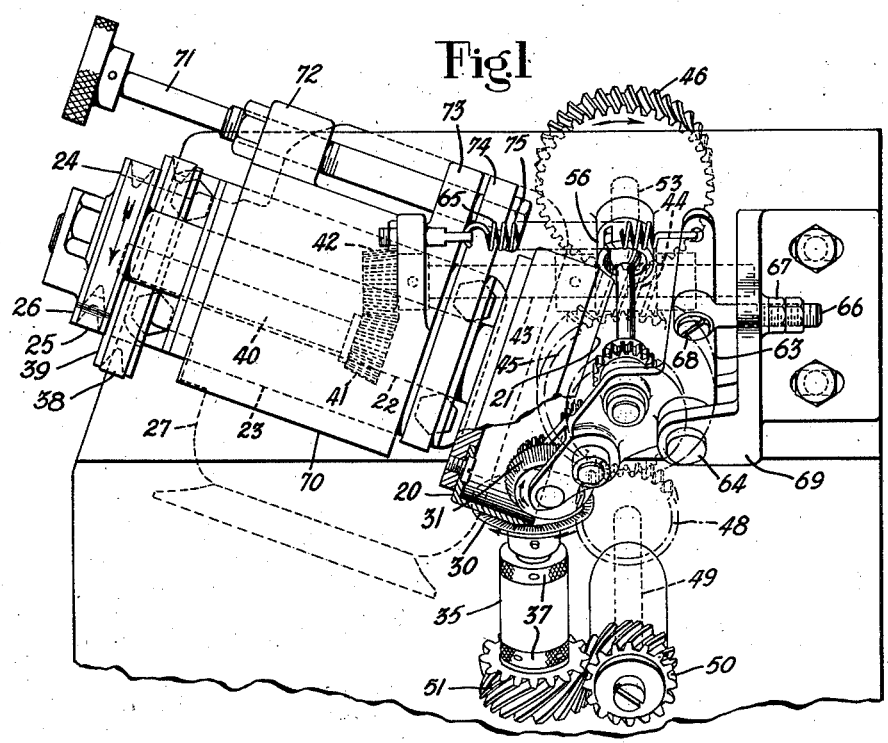
Fig. 1 is a front elevation, partly in section, of a trimming assemblage embodying the present invention.
Figure 2:
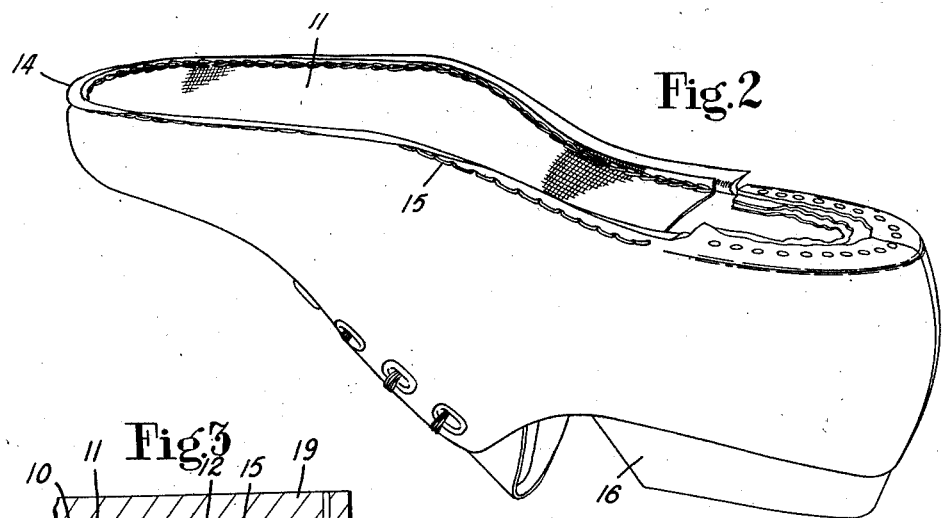
Fig. 2 is a perspective view of a thread-lasted stitch-down shoe that has been trimmed in accordance with the requirements to which the invention relates.

A stitchdown shoe of the type under consideration comprises an insole 10, a midsole 11 of woven material such as canvas, a lining 12 of woven material, a doubler 13 of woven material, an upper 14 of leather, and lasting stitches 15 connecting the upper, the doubler, and the midsole. The lining 12, instead of being turned outwardly, is turned inwardly and secured to the bottom of the insole with lasting cement, after which the midsole 11 is secured to the lining and the insole also with lasting cement. Consequently, the lasting stitches 15 extend only through the upper, the doubler, and the midsole, and the margins of these three layers constitute a three-ply flange 17 that requires the trimming operation hereinafter described. The elements above described are assembled and fabricated on a last 16.

To produce the desired result the flange 17 must be trimmed with a beveling cut that will intersect the midsole 11 on a line relatively close to the stitches 15 but will intersect the upper on a line relatively distant from the stitches. The margin of the upper that lies outside the stitches is required at a subsequent stage to form a lap joint with the beveled inner edge of a mock welt 18 to be secured to said margin by cement. When this joint is formed the beveled edge of the mock welt lies against the outer surface of the trimmed margin of the upper and conceals the stitches 15. To insure a satisfactory lap joint between the mock welt and the projecting margin of the upper, the width of this margin and the angle of its bevel must both be uniform.

The illustrated trimming machine (see Fig. 1) comprises a rotary hollow cutter 20 having an annular cutting edge 21. The cutter is affixed to a shaft 22 that extends through an axially adjustable bearing sleeve 23 and is provided with a pulley 24 to which rotation is transmitted by a belt 25. The belt also runs on a driving pulley 26 affixed to the armature shaft of an electric motor 27.

As shown in Fig. 4, a segment of the cutter is nested in a dished feed-roll 30. This nested relation places the cutting portion of the cutter adjacent to an annular work engaging surface 32 on the rim of the feed-roll and in oblique relation thereto. The surface 32 constitutes a cutting bed, and when the flange 17 of a shoe is placed thereon as shown in Fig. 5 it is gripped by that surface and the peripheral surface of a yielding presser-roll 31. A segment of the presser-roll projects into the mouth of the cutter and is surrounded by the cutting edge 21. The nip of the rolls 30 and 31 is thus located close to the cutting edge, and the gripping surfaces of the rolls maintain the gripped portion of the work in oblique relation to the bottom of the shoe and to the cutting segment. Consequently, the trimming cut severs the margin of the midsole close to the stitches 15 but severs the margin of the upper at a greater distance from the stitches.

The cutter is rotated in a direction that causes its frictional drag through the work to maintain the root of the flange 17 against the rim of the feed-roll 30 which is thin enough to lie in the angle or crease formed by the body of the upper and the margin outside the line of stitches 15. Consequently, the rotation of the cutter not only produces a draw cut but it also insures uniform width of the trimmed margin of the upper.

Both of the rolls 30 and 31 are driven to feed the work and their gripping surfaces are knurled or scored to insure an adequate feeding effect.

The locations of the cutter and the dished feed-roll 30 are both fixed to maintain a constant cooperative relation of these two elements, but the presser roll 31 is mounted in a manner that permits it to move toward and from the rim of the roll 30 to accommodate materials of non-uniform thickness that may pass between the rolls, as at the toe end of a shoe where a toe-box may provide an additional layer, or at the tip-line where a seam may be formed by the vamp and a tip. Such inequalities in the aggregate thickness of the flange 17 will not produce any inequality in the width of the trimmed margin of the upper because the constant cooperative relation between the cutter and the dished roll 30 will maintain the line of cutting at a constant distance from the root of the flange.

As shown in Fig. 4, the dished feed-roll 30 is affixed to the upper end of a spindle 33. This spindle is journaled in a bearing sleeve 34 and the latter is adjustably secured in a fixed supporting bracket 35 that projects from the frame 36. The ends of the sleeve 34 are provided with screw-threads and adjusting nuts 37 by which the sleeve may be adjusted endwise to locate the roll 30 in the desired relation to the cutter 20.

Referring to Fig. 1, the pulley 26 carried by the armature shaft of the motor 27 is provided with a groove for a transmission belt 38 in addition to a groove for the belt 25 that drives the cutter. The purpose of the belt 38 is to transmit rotation to the feed-rolls 30 and 31 through gear trains now to be described. The driven pulley 39 (see also Fig. 4) that receives rotation from the belt 38 is affixed to a shaft 40. Bevel gears 41, 42 transmit rotation from the shaft 40 to a shaft 43. A worm 44 affixed to the shaft 43 cooperates with two worm-wheels 45 and 46 one of which transmits rotation to the feed-roll 30 and the other to the presser roll 31.

The train of driving connections for the roll 30 comprises a spur gear 47, a spur gear 48, a shaft 49, and spiral gears 50 and 51. The gear 51 is affixed to the spindle 33, the gears 50 and 48 are both affixed to the shaft 49, and the gear 47 is affixed to the worm-wheel 45. The unit comprising the worm-wheel 45 and the spur gear 47 is rotatably mounted on a fixed stud 52 secured to the frame.

The operating connections for transmitting rotation from the worm-wheel 46 to the presser-roll 31 comprise a shaft 53, a spur gear 54, an intermediate shaft 55 having a universal joint connection 56 with the shaft 53 and a universal joint connection 57 with the gear 54, a spur gear 58 and an intermediate spur gear 59 by which the rotation of the gear 54 is transmitted to the gear 58. The gear 58 and the presser-roll 31 are both affixed to a common shaft 60, the intermediate gear 59 is affixed to a shaft or stem 61, and the gear 54 is affixed to a shaft or stem 62. The shafts 60, 61 and 62 are all journaled in a movable support in the form of a bell-crank lever 63 to provide for movement of the presser-roll 31 toward and from the dished roll 30. The lever 63 is mounted on a pivot pin or fulcrum 64 and one of its arms is pulled by a tension spring 65 to move the presser-roll 31 toward the feed-roll 30. A stem 66 connected to the lever 63 by a pivot stud 68 projects loosely through a hole in a bracket 69 and is provided with a screw-thread and a nut 67. This nut abuts the bracket to limit the movement of the roll 31 toward the roll 30 when no work is between the rolls.

It is to be observed in Fig. 1 that the axis of the cutter and its shaft 22 is inclined to permit nesting the lower portion of the cutter in the dished roll 30. To counteract shortening of the cutter in consequence of sharpening it, provision is made for adjusting the bearing sleeve 23 endwise. For this purpose, the sleeve is arranged to slide in a bore in a supporting fixture 70 bolted to the frame 36. An adjusting rod 71 extends through bosses 72 and 73 both formed on the fixture 70 and through a lug 74 formed on the sleeve 23. A screw-thread on the rod engages an internal thread in the boss 72 but the rod has a smooth bearing in the boss 73 and a swivel connection with the lug 74. The lug is flanked on one side by a shoulder formed on the rod, and on the other side by a nut 75 secured to the rod. A constant relation of the shaft 22 and the sleeve 23 is maintained by thrust bearings. Consequently, the adjusting rod 71 is effective to locate the low portion of the cutting edge 21 approximately at the center of the feed-roll 30.

Figure 3:
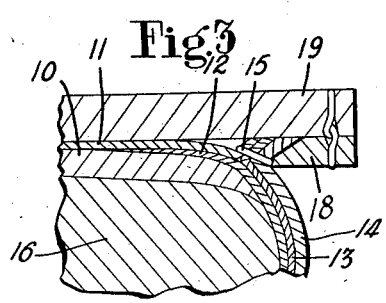
Fig. 3 is a sectional view of a fragment of an outsoled shoe.

Referring to Fig. 3, after the flange 17 of a shoe has been trimmed as herein described, a welt 18 is attached to the margin of the upper with cement, an outsole 19 is attached with cement and thereafter stitched to the welt, and the outsole and welt are trimmed to final configuration.

Having thus described my invention, what I claim as new and desire to secure by Letters Patent of the United States is:

1. A trimming machine comprising a dished feed-roll having an annular end surface constituting a cutting bed and a circular cavity surrounded thereby, a rotary hollow cutter having an annular cutting edge one segment of which is nested in said cavity and another segment of which is arranged to trim, with a beveling cut, material lying on said cutting bed, a presser-roll the periphery of which projects partly into and partly out of the mouth of said cutter and is arranged to maintain the work against said cutting bed, means arranged to rotate said cutter, and means arranged to rotate said feed-roll.

2. A trimming machine comprising a dished roll and a presser-roll, an annular work-engaging surface of the dished roll and the peripheral surface of the presser-roll being cooperatively related to grip the outturned flange of a lasted stitchdown shoe, said dished roll also having a thin peripheral rim formed to run in the upper-crease of the shoe, means by which said rolls are driven to feed the shoe, a rotary hollow cutter having an annular cutting edge arranged to surround a segment of said presser-roll and project into the cavity in said dished roll, means for maintaining a constant cooperative relation of said dished roll and said cutter, the gripping surfaces of said rolls being arranged to maintain the gripped portion of said flange in oblique relation to the cutting segment of said cutter, and means by which said cutter is driven in a direction to maintain the body of the shoe against said rim of said dished roll.

EUGENE J. RAY.